United States Patent
Yamazaki

[19]

[11] Patent Number: 6,117,037
[45] Date of Patent: Sep. 12, 2000

[54] TOROIDAL CONTINUOUS VARIABLE TRANSMISSION

[75] Inventor: Atsushi Yamazaki, Kanagawa, Japan

[73] Assignee: Isuzu Motors Limited, Tokyo, Japan

[21] Appl. No.: 09/265,375

[22] Filed: Mar. 10, 1999

[30] Foreign Application Priority Data

Mar. 13, 1998 [JP] Japan .................................. 10-080511

[51] Int. Cl.[7] ................................................. F16H 37/02
[52] U.S. Cl. ................................ 475/216; 476/41; 476/42
[58] Field of Search ............................. 475/216; 476/40, 476/41, 42

[56] References Cited

U.S. PATENT DOCUMENTS

| 4,628,766 | 12/1986 | De Brie Perry | 475/216 |
| 4,968,289 | 11/1990 | Nakano | 476/41 |
| 5,683,324 | 11/1997 | Inoue et al. | 475/216 |
| 5,888,160 | 3/1999 | Miyata et al. | 475/216 |

FOREIGN PATENT DOCUMENTS

| 0003408 | 8/1979 | European Pat. Off. . |
| 3212769 | 10/1983 | Germany . |
| 63-60750 | 4/1988 | Japan . |
| 1193454 | 8/1989 | Japan . |
| 2163549 | 6/1990 | Japan . |
| 2200175 | 7/1988 | United Kingdom . |
| 9834051 | 8/1998 | WIPO . |

OTHER PUBLICATIONS

Patent Abstracts of Japan, Pub. No. 62255654, Pub. Date Nov. 7, 1987.

Patent Abstracts of Japan, Pub. No. 06174036, Pub. Date Jun. 21, 1994.

*Primary Examiner*—Charles A Marmor
*Assistant Examiner*—Ankur Parekh
*Attorney, Agent, or Firm*—Browdy and Neimark

[57] ABSTRACT

A toroidal continuous variable transmission is disclosed in which no power is transmitted to toroidal speed changers during the engagement of a direct clutch. The toroidal continuous variable transmission is constructed such that the engagement of the direct clutch causes an input shaft to connect drivingly with an output shaft through a planetary gear system whereby the power may be transmitted from the input shaft to the output shaft. The release of the forward clutch makes reverse means freewheeling so that no load is applied to output disks. As a result, none of the input disks are subjected to the thrust force at the loading cam, regardless of the rotation of the input shaft. Therefore, although the toroidal speed changers may make only the idling in unison with the input shaft, none of the input disks are forcibly urged against the power rollers.

6 Claims, 1 Drawing Sheet

TOROIDAL CONTINUOUS VARIABLE TRANSMISSION

BACKGROUND OF THE INVENTION

1. Field of the Invention

The present invention relates to a toroidal continuous variable transmission adapted for the vehicle such automobiles.

2. Description of the Prior Art

The toroidal continuous variable transmission has been well known as a type of speed-changing means applicable to the vehicle such as automobiles. Most toroidal continuous variable transmission are in general of at least one toroidal rotary speed changer arranged in-line or tandem array, each of which toroidal rotary speed changers is composed of an input disk driven by an input shaft, an output disk arranged confronting with the input disk and connected to an output shaft, and power rollers arranged in frictional rolling-contact with both the disks. In the toroidal continuous variable transmission, varying the tilt of the power rollers causes the continuous variable variation in the speed of rotation that is to be transmitted from the input disk to the output disk.

Examples of the prior toroidal continuous variable transmissions are disclosed in Japanese Patent Laid-Open Nos. 193454/1989 and 163549/1990.

In most toroidal continuous variable transmissions, when the transmission is in the forward range, the power from the engine is transmitted the output shaft after being always governed at the toroidal speed changers. For the reason described just above, even on driving at a constant speed on, for instance, the motorway for many hours, the power from the engine is transmitted continuously through the toroidal speed changer, irrespective of the speed-changing manipulation being scarcely necessary. This causes a major problem of making less an acceptable service life of the toroidal speed changers. To cope with this problem, a prior toroidal continuous variable transmission, for example, disclosed in Japanese Utility Model Laid-Open No. 60750/1988, has been developed in which a direct clutch is provided to directly couple together the input and output shafts.

Nevertheless, the prior toroidal continuous variable transmission has another aspect of problem in which the direct clutch of a large capacity is inevitably required because the direct clutch is constructed so as to under take entirely the transmission of the whole torque.

In contrast, a improved toroidal continuous variable transmission has been developed to relate to the present invention, wherein a planetary gear mechanism is incorporated between the toroidal speed-changing means and the output shaft so as to share partially the torque to be transmitted. The following will explain a developed toroidal continuous variable transmission with reference to FIG. 2.

Shown in FIG. 2 is a toroidal continuous variable transmission of the type what is called "double-cavity type toroidal continuous variable transmission" in which toroidal speed changers, or 2-set of toroidal speed changers 1, 2, are arranged co-axially in a tandem array on an in-line main shaft 3. The first toroidal speed changer 1 comprises an input disk 4, an output disk 5 arranged confronting with the input disk 4, and power rollers 6 arranged between the confronting input and output disks 4, 5 and making frictional engagement with toroidal or doughnut-shaped surfaces of both the disks 4, 5. The second toroidal speed changer 2, likewise the first toroidal speed changer 1, comprises an input disk 7, an output disk 8 arranged confronting with the input disk 7, and power rollers 9 arranged between the confronting input and output disks 7, 8 and making frictional engagement with toroidal or doughnut-shaped surfaces of both the disks 7, 8. The toroidal speed changers 1, 2 each have two power roller 6, 9 each of which is supported for rotation about its rotational axis 10 while for pivoting movement on a pivotal axis 11 that is perpendicular to the rotational axis, or normal to the plane surface of this paper.

The input disks 4, 7 in the toroidal speed changers 1, 2 may move along the axial direction of the main shaft 3, but rotate together with the main shaft 3 in unison. The power or torque produced by the engine is transmitted through a torque converter into an input shaft 13 that is arranged co-axially with the main shaft 3 in in-line array. The input shaft 13 has at its terminal end a loading cam 14 provided with roller cams 15, the cam motion of which generates a thrust force to urge the input disks 4, 7 against the power rollers 6, 9 in accordance with the amplitude of the input torque, resulting rotating the input disk 4 and further another input shaft 7 through the main shaft 3. It will be thus understood the main shaft 3 serves as the input shaft for the input disks 4, 7. The thrust force is to increase the contact pressure between the power rollers 6, 9 and their associated disks of the input and output disks 4, 7 and 5, 8 to thereby provide the frictional-engaging force that depends on the amplitude of the torque to be transmitted.

The power rollers 6, 9 in the toroidal speed changers 1, 2 are designed for pivoting or rocking movement on their pivotal axes 11 so that the rotation of the input disks 4, 7 may be varied continuously through the power rollers 6, 9 and transmitted to the output disks 5, 8. The power rollers are each mounted on a trunnion, not shown, for rotation as well as for pivoting or rocking movement.

It is to be noted that the rotational axes of the power rollers 6, 9 are coincident with the axis of the main shaft 3. That is, on the neutral position where both the axes of the power rollers and main shaft are on the same plane surface, the power rollers 6, 9 may keep steady their tilt angles corresponding to the neutral position and therefore the ratio of the output speed to the input speed is kept constant. With the movement of the trunnions along the axial direction of the pivotal axes 11 during the transmission of the torque, the power rollers 6, 9 also displace along the axial direction of their pivotal axes 11 whereby the rolling-contact locations of the power rollers 6, 9 with the input and output disks 4, 7 and 5, 8 are deviated from the contact locations at the neutral position. As a result, the power rollers 6, 9 are subjected to the pivotal forces applied from the disks so as to pivot on their pivotal axes 11 with the direction and velocity, which depend on the direction and amount of their displacements along the pivotal axes 11. This pivoting movement of the power rollers 6, 9 causes the variations of the ratio between a radius defined by loci of the rolling-contact locations of the power rollers with the input disks 4, 7 and another radius defined by loci of the rolling-contact locations of the power rollers with the output disks 5, 8 whereby the speed may be variable continuously. The pivoting movement of the power rollers 6, 9 may be adjusted by a controller unit, not shown, which controls the displacements of the trunnions along the pivotal axes 11 through the operation of the actuator so as to attain the desired speed ratio.

The output disks 5, 8 are supported on a connecting shaft 22 through a spline fit or the like so as to turn in unison. The connecting shaft 22 is of a hollow tube in which the main shaft 3 is fitted for rotation relatively to each other and a sprocket wheel 24 is provided integrally midway the tube. The output disks 5, 8 are supported on a casing 25 through bearings, not shown, which may bear both the thrust and radial loads. The power or torque transmitted to the output disks 5, 8 is taken off at a counter shaft 28 through a first power-transmitting means of a chain gearing composed of the sprocket wheel 24, an endless chain 26 and an intermediate sprocket wheel 28 that is mounted to an extremity of the counter shaft 28.

The counter shaft 28 is provided at another extremity thereof with a forward clutch 29 that is drivingly connected at the output side thereof to a gear 30 meshed with a gear 31 fixed to an final output shaft 32 of this power train. The gear train described just above constitutes a gear reduction mechanism and therefore the forward clutch 29 may change the counter shaft 28 and gear 30 from the torque-transmitting phase to the idling phase and vice versa. Combination of the gears 30, 31 also constitutes a second power-transmitting means, or a reverse power-transmitting means, to transmit the rotation of the counter shaft 28 in opposite rotational direction to the output shaft 32. The power train, consisting of the first power-transmitting means of the chain gearing 23, the counter shaft 28 and the second power-transmitting means of gears 30, 31, constitutes a reverse mechanism to transmit the rotation of the output disks 5, 8 to the output shaft 32 in the rotational direction opposite or reversed with each other.

Arranged between the main shaft 3 and the output shaft 32 is a planetary gear system 33 comprised of a sun gear 34 connected to the main shaft 3, planet pinions 36 supported on a planet carrier 35 so as to mesh with the sun gear 34, and an internal ring gear 37 connected to the output shaft 32 so as to mesh with the planet pinions 36. Combined between the planet carrier 35 and the casing 25 is a reverse clutch 38 to shift the planet carrier 35 to the freewheeling phase or the held phase with respect to the casing 25.

A direct clutch 39 is further provided to connect directly the output shaft 32 with the main shaft 3 that functions as an input shaft for the toroidal speed changers 1, 2. The direct clutch 39 is capable of rendering the carrier 35 into the connection with the internal ring gear 37. Engaging the direct clutch 39 causes the carrier 35 to hold the ring gear 37 whereby the main shaft 3 turns together with the output shaft 32 as a unit through the planetary gear system 33.

Operation of the toroidal continuous variable transmission constructed as described above will be explained hereinafter. With driving the engine, the power or torque from the engine is applied through the torque converter 12 to the input shaft 13 and in turn transmitted to the input disk 4 of the first toroidal speed changer 1 through the loading cam 14 and roller cam 15. The rotation of the input disk 4 makes the power rollers 6 rotate and, in turn, the rotation of the power rollers is transmitted to the output disk 5. Concurrently with this, the torque from the input disk 13 is applied through the main shaft 3 to the input disk 7 of the second toroidal speed changer 2. The rotation of the input disk 7 is transmitted to the output disk 8 through the power rollers 9.

On forward driving, the forward clutch 29 is engaged while the reverse clutch 38 is released. In this condition, the counter shaft 28 is in the torque-transmitting phase to the gear 30 while the planet carrier 35 is in the planetary gear system 33 is in the freewheeling phase relatively to the casing 25. The rotation of the output disks 5, 8 is transmitted from the connecting shaft 22 to the main shaft 32 through the chain gearing 23 and further in turn the counter shaft 28, forward clutch 29 and gears 30, 31. If the input shaft 13 were rotated in the forward direction, the counter shaft 28 would be rotated in the reverse direction. This reverse rotation is reversed again by the gears 30, 31, resulting in the forward rotation of the output shaft 32. On the other hand, as the reverse clutch 38 is disconnected, the planet carrier 35 is in the freewheeling phase relatively to the casing 25 so that, even if the sun gear 34 drivingly connected to the main shaft 3 rotates, the planetary motion of the pinions 36 may absorb the difference of rotation between the sun gear 34 and the internal ring gear 37 turning together with the output shaft 32.

When the main shaft 3 is connected to the output shaft 32 as in high-speed forward driving, the direct clutch 39 establishes the driving connection of the planet carrier 35 with the internal ring gear 37 of the planetary gear system 33. While the forward clutch 29 shifts the reverse mechanism into the idling phase and the reverse clutch 38 is kept on disengagement, or the planet carrier 35 of the planetary gear system 33 is in the freewheeling phase relatively to the casing 25 of this power-transmitting system. During disengagement of the reverse clutch 38, the engagement of the direct clutch 39 permits the planet carrier 35 to make the torque-transmitting relation with the internal ring gear 37 of the planetary gear system 33. Upon energizing the direct clutch 39, the planet carrier 35 is held in unison with the internal ring gear 37 so that the pinions 36 are held against rotation. By contrast, as the main shaft 3 turns in unison with the sun gear 34 of the planetary gear system 33, the pinions 36 meshed with sun gear 34 rotates in unison with the sun gear 34 to the internal ring gear 37 meshed with the pinions 36 to turn together as an unit. It will be thus understood that the direct clutch 39 connects integrally the main shaft 3 with the output shaft 32 through the planetary gear system 33 so as to establish the direct driving connection between the main shaft 3 and the output shaft 32.

On the reverse range, the reverse clutch 38 is energized whereas the forward clutch 29 is released. The carrier 35 of the planetary gear system 33 is held against the casing 25 so that none of the pinions 39 are driven. The turning of the main shaft 3 may be directly transmitted to the planetary gear system 33 without through the toroidal speed changers 1, 2. The torque in the planetary gear system 33 is applied to the output shaft 32 through the sun gear 34, pinions 36 rotatable only on their own axes, and internal ring gear 37. As the forward clutch 29 leaves the counter shaft 28 and gear 30 freewheeling, the rotational movement of the gears 30, 31 in unison with the output shaft 32 is unobstructive to the rotation of the output disks 5, 8, chain gearing 23 and counter shaft 28. If the input shaft 13, or the main shaft 3, were rotated in the forward direction, the sun gear 34 would be rotated in the forward direction. Nevertheless the planet carrier 35 is kept against rotation and therefore the output shaft 32 is driven in the reverse rotational direction due to the internal ring gear 37.

To change the speed ratio during the output shaft 32 being stalled, the release of the forward clutch 29 may be necessary. As the rotation of the input disks 4, 7 may be transmitted to the output disks 5, 8 through the power rollers 6, 9 with no application of torque to the toroidal speed changers 1, 2, the release the forward clutch 29 makes it possible to cause the power rollers 6, 9 to vary their pivot angles or tilting angles owing to the deviation of the trunnions along the axial direction of the pivotal axes 11. Consequently, even if the landing wheels are locked under such condition that no maximum speed ratio is provided by the toroidal speed changers 1, 2, the power rollers 6, 9 are permitted to adjust their pivot angles or tilting angles so as to attain the maximum speed ratio when idling, so that the vehicle may restart to move.

In the toroidal continuous variable transmission described above, the power or torque from the engine is delivered to the toroidal speed changers 1, 2 through the torque converter 12, input shaft 13 and loading cam 15. The torque, following speed changing to the desired speed ratio, is transmitted to the counter shaft 28 and then to the output shaft 32 through the reduction gear train, or gears 30, 31. In case where no manipulation of speed changing is necessary as in driving at a constant speed on the motorway for many hours, the toroidal continuous variable transmission makes it possible to transmit directly the turning of the input shaft 13 to the output shaft 32 by energizing the direct clutch 39.

In the toroidal continuous variable transmission of the prior type described above, nevertheless, the main shaft 3 and the input shaft 13 are provided separately from each other, the input shaft 13 being provided at the extremity thereof with the loading cam 14 while the main shaft 3 being provided at its extremity with the input disk 4 that is mounted for displacement along the axial direction of the main shaft 3 and against rotation relatively to the main shaft 3. Hence, according to the toroidal continuous variable transmission, even when the power transmission is carried out with the direct clutch 39 energized, it is required to forcibly urge the input disk 4 against the output disk 5 with the strong force in order to attain the reliable transmission of torque from the input shaft 13 to the main shaft 3. That is, on the power transmission with the direct clutch 39 being kept in engagement, the input and output disks 4, 7 and 5, 8 and power rollers 6, 9 in the toroidal speed changers 1, 2 rotate in unison with being subjected continuously to the very strong urging force regardless of nothing to do the power transmission. This results in a problem of making less an acceptable service life of the toroidal speed changers 1, 2. This disadvantage is also true in the prior toroidal continuous variable transmissions of the type, for example, disclosed in Japanese Utility Model Laid-Open No. 60750/1988, other than that described above.

Accordingly, how to eliminate the urging force along the axial direction of the toroidal speed changers with the direct clutch being in engagement has been heretofore recognized as a major problem in the toroidal continuous variable transmission equipped with the planetary gear system.

SUMMARY OF THE INVENTION

The present invention has for its primary object to overcome the shortcomings in the prior art as described just above and in particular to provide an improved toroidal continuous variable transmission in which no power or torque is transmitted to toroidal speed changers under the condition during which a direct clutch is in engagement whereby the toroidal speed changers may be improved in durability and prolonged in their available service life.

The present invention relates to a toroidal continuous variable transmission comprising thrusting means secured to an input shaft and generating a thrust force along an axial direction of the input shaft, a first input disk arranged confronting to the thrusting means and supported for rotation as well as axial movement relatively to the input shaft, a second input disk mounted for axial movement with respect to the input shaft, output disks arranged in opposition to the first and second input disks, one to each input disk, power rollers arranged between the paired input and output disks so as to change continuously the rotational speed ratio of the second input shaft to the first input shaft, depending on pivotal angles to the disks, thereby transmitting a power of changed speed to the output disks, reverse means for transmitting rotations of the output disks in an opposite rotational direction, to an output shaft, a forward clutch for shifting the reverse means from a torque-transmitting phase to an idling phase and vice versa, a planetary gear system provided to the input shaft, and a direct clutch for changing over operating phases of the planetary gear system.

The present invention relates to the toroidal continuous variable transmission wherein the planetary gear system is composed of a sun gear rotatable in unison with the input shaft, a planet carrier supporting for rotation pinions that mesh with the sun gear, and ring gear meshed with the pinions and secured to the output shaft.

The present invention relates to the toroidal continuous variable transmission wherein the direct clutch changes over operating phases of the planetary gear system by locking mutually any two members selected out of the sun gear, carrier and ring gear.

According to the toroidal continuous variable transmission of the present invention constructed as described above, on normal forward driving, the direct clutch operates so as to make the idling phase the output shaft and the input shaft that is connected to the planetary gear system while the forward clutch shifts the reverse means into the torque-transmitting phase. That is, the direct clutch is in disengagement while the forward clutch is engaged. As a result, as the rotation of the output disk is transmitted to the output shaft through the reverse means in an opposite rotational direction, the output shaft is driven in a rotational direction identical with that of the input shaft.

On direct drive, or high-speed range, the direct clutch is changed over so as to hold any two members out of the sun gear, planet carrier and ring gear of the planetary gear system. Hence, the input and output shafts are connected drivingly with each other through the direct clutch and the planetary gear system whereby the torque train may be changed so as to be transmitted directly from the input shaft to the output shaft. Concurrently with the engagement of the direct clutch, the forward clutch is brought into the disengagement to thereby make the reverse means idling or freewheeling, so that no load is applied to the output disks. As a result, none of the input disks are subjected to the axially urging force from the thrusting means, regardless of the rotation of the input shaft. Therefore, although the toroidal speed changers may make only the idling in unison with the input shaft, none of the input disks are forcibly urged against the power rollers.

The direct clutch is designed so as to mutually hold any two members out of the sun gear, planet carrier and ring gear of the planetary gear system. That is, the direct clutch may operate, for example, to mutually hold both of the sun gear, or the input shaft, and the carrier, alternatively to mutually hold both the carrier and the ring gear.

The planetary gear system is provided with a reverse clutch to shift the carrier to the freewheeling phase or held phase with respect to a casing of the transmission. Upon reverse range, the direct clutch is disengaged so as to make the output shaft idling with respect to the input shaft while the forward clutch is also disconnected to render the reverse mechanism idling and then the reverse clutch is engaged. This engagement of the reverse clutch causes the planet carrier to hold against the casing of the transmission. On this phase, the rotation of the sun gear in unison with the input shaft is reversed in opposite rotational direction by means of the pinions, which are permitted to turn only on their axes, whereby the output shaft is driven in the rotating direction contrary to that of the input shaft. In addition, the rotation of the sun gear may be reduced and transmitted to the internal ring gear. This reduction in the reverse range answers with the actual need in which the reverse range requires no higher speed compared with the forward driving. On other driving ranges, the reverse clutch keeps the carrier on freewheeling phase with respect to the casing of the transmission to provide for the forward range and the high-speed direct drive.

Moreover, during the reverse clutch keeping the carrier on the freewheeling phase with respect to the casing, the direct clutch makes it possible to change the input shaft into the torque-transmitting phase with the output shaft. When the direct clutch brings the input shaft in torque-transmitting phase with the output shaft, the reverse clutch renders the carrier freewheeling with respect to the casing so as to permit the unobstructive rotation of the carrier in unison with the input shaft.

The reverse means is comprised of a counter shaft arranged in parallel with the input shaft, first power-transmitting means connecting drivingly the output disks with an extremity of the counter shaft, and second power-transmitting means connecting drivingly the output shaft with the opposite end of the counter shaft, and the reverse means is provided by any one of the first and second power-transmitting means. The reverse means is provided to make the output shaft identical with the input shaft in the rotational direction because the input and output disks are opposite to each other in their rotational direction. The reverse means may be arranged at any desired location in the power-transmitting route including the counter shaft.

In accordance with the toroidal continuous variable transmission constructed as described above, no cam motion due to the thrusting means happen when the direct clutch is in engagement, so that no power is transmitted to the toroidal speed changers, resulting in improvement of torque-transmitting efficiency. Moreover, upon the engagement of the direct clutch, as no power is transmitted to the toroidal speed changers, or no force occurs for urging strongly the input disks against the power rollers, the toroidal speed changers may be improved in durability and prolonged in their available service life. In addition, no strong force urging the input disks against the power rollers takes place not only in the engagement of the direct clutch but also in the reverse range. This may contribute to making longer the acceptable service life of the toroidal speed changers so that the entire transmission is improved in service life.

DETAILED DESCRIPTION OF THE PREFERRED EMBODIMENTS

Figure 1:
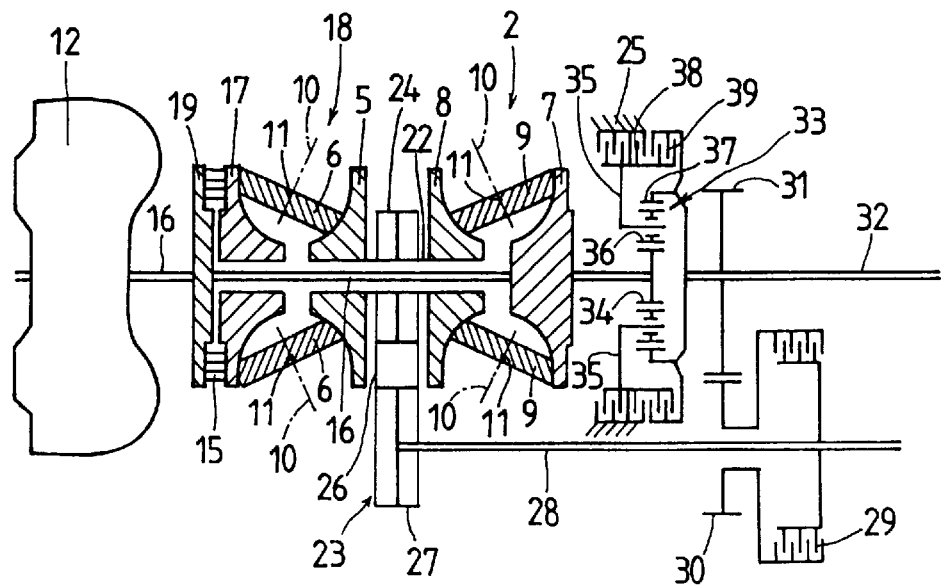
FIG. 1 is a schematic illustration showing a preferred embodiment of a toroidal continuous variable transmission according to the present invention.

Preferred embodiment of the toroidal continuous variable transmission according to the present invention will be explained below with reference to FIG. 1. The toroidal continuous variable transmission in FIG. 1 is substantially identical with the prior toroidal continuous variable transmission in FIG. 2 except for the mutually related structure of the loading cam, input disk and input shaft. Thus, similar reference characters designate similar elements or components in the following description, and the previous description will be applicable.

The engine torque is transmitted to an input shaft 16 through the torque converter 12. A loading cam 19 is mounted on the input shaft 16 through a spline fit, not shown, and secured against the axial movement so as to turn in unison with the input shaft 16. A first toroidal speed changer 18 has a first input disk 17 supported on the input shaft 16 for rotation and for axially sliding movement with respect to the input shaft 16. The first input disk 17 is arranged confronting with the loading cam 19 so as to sandwich roller cams 15 between them. The roller cams 15 are each designed such that as the loading cam 15 turns relatively to the input disk 17, a thrust force may be generated to urge the input disk 17 against the opposing output disk 5.

The second toroidal speed changer 2 has the second input disk 7 that may move along the axial direction of the input shaft 16 and turn in unison with the input shaft 16. That is, the input disk 7 is drivingly connected to the input shaft 16 through, for example, a ball-spline coupling and forced towards the opposing output disk 8 so as to be allowable to move a little along the axial direction of the input shaft 16 by the action of a diaphragm spring, which is interposed between the input disk 7 and a nut screwed on the input shaft 16. The input disk 7 may move towards the output disk 8, depending on the axial displacement of the input shaft 16 by the action of the cam motion of the loading cam 19, so as to increase the contact pressure applied to the power rollers 9 between the cooperating input and output disks 7, 8.

Figure 2:
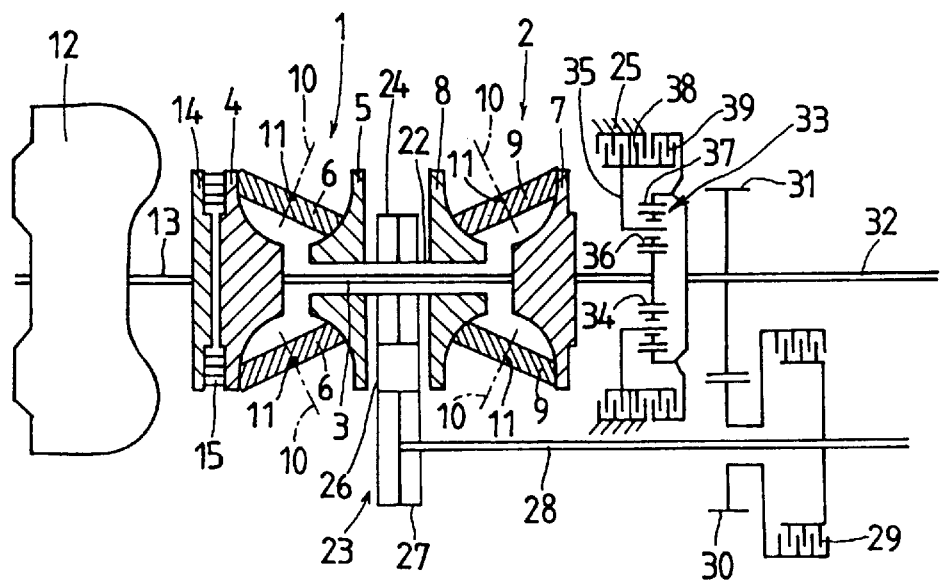
FIG. 2 is a schematic illustration showing an exemplary prior toroidal continuous variable transmission.

The output disks 5, 8 of the toroidal speed changers 1, 2, like the disks in FIG. 2, are arranged back to back and connected to the connecting shaft 22 through the spline fit or the like so as to turn together as an unit. The connecting shaft 22 is of a hollow tube in which the input shaft 16 is fitted for rotation relatively to each other and the sprocket wheel 24 is provided integrally midway the tube. The output disks 5, 8 are supported on a casing 25 through bearings, not shown, which may bear both the thrust and radial loads.

Next, the operation of the toroidal continuous variable transmission of the present invention will be explained in detail. The toroidal continuous variable transmission of the present invention is substantially identical with the prior toroidal continuous variable transmission in FIG. 2 in the speed-changing operations during normal driving and during the output shaft being stalled, except for the speed-changing operation at the forward driving phase during which the direct clutch is thrown in the engagement. Thus, the previous description in the prior art will be applicable.

A mechanism for generating the thrust force along the axial direction of the input shaft 16 is composed of the loading cam 19 and roller cams 15. When the forward clutch 29 is in engagement or the output disks 5, 8 are drivingly connected with the output shaft 32, the input shaft 16 turns to drive the loading cam integral with the input shaft 16 because the output disks 5, 8 are loaded. As a result, the loading cam 19 is going to rotate relatively to the input disk 17. At this time, the roller cams 15 interposed between the loading cam 19 and the input disk 17 may apply the thrust force to the first input disk 17 that is in turn forced to move rightward in FIG. 1 to thereby apply the increased contact pressure to the power rollers 6, 9 in cooperation with the output disk 5. Concurrently, the input shaft 16 moves reactively leftward in FIG. 1 together with the second input disk 7 that in turn exerts the strong contact pressure to the power rollers 9 in cooperation with the output disk 8. Hence, the rotations of the input disks 17, 7 are each transmitted into the output disks 5, 8 through their associated power rollers 6, 9.

With the direct clutch 39 being brought into engagement, the input and output shafts 16, 32 are directly connected to each other through the direct clutch 39 and the planetary gear system 33 so that the torque may be directly transmitted from the input shaft 16 to the output shaft 32. The release of the forward clutch 29, then, makes idling the reverse mechanism composed of the chain gearing 23, counter shaft 28 and reduction gears 30, 31, resulting in unloading the output disks 5, 8. On the phase described just above, none of the input disks 7, 17 are subjected to the thrust force at the loading cam 19, regardless of the rotation of the input shaft 16. That is, there is substantially no relative rotation of the input disk 17 with the loading cam 19. Therefore, although the toroidal speed changers 18, 2 may make only the idling or freewheel in unison with the input shaft 16, none of the input disks 17, 7 are forcibly urged against the power rollers 6, 9. Further, even if the relative rotation happened between the input disk 17 and the loading cam 19, the rotations of the input disks 17, 7 might be absorbed as the rotational movements of the output disks 5, 8 and no torque of the input shaft 16, after all, would be transmitted to the toroidal speed changers 1, 2, which are left idling or freewheeling in unison with the input shaft 16.

Upon reverse range, the direct clutch 39 is disengaged so as to make the output shaft 32 idling with respect to the input shaft 16 while the forward clutch 29 is also disconnected to render the reverse mechanism 23, 28, 30 and 31 idling and then the reverse clutch 38 is engaged. This engagement of the reverse clutch 38 causes the planet carrier 35 to hold against the casing 25 of the transmission. On this phase, the rotation of the sun gear 34 in unison with the input shaft 16 is reversed in opposite rotational direction by means of the pinions 36, which are permitted to turn only on their axes, whereby the output shaft 32 is driven in the rotating direction contrary to that of the input shaft. In addition, the rotation of the sun gear 37 may be reduced and transmitted to the internal ring gear 37.

Moreover, with the forward clutch 29 being disengaged at the reverse range, the output disks 5, 8 and the reverse mechanism 23, 28, 30 and 31 are rendered idling. As a result, none of the input disks 7, 17 are subjected to the thrust force at the loading cam 19, regardless of the rotation of the loading cam 19 together with the input shaft 16. Therefore, although the toroidal speed changers 18, 2 may make only the idling in unison with the input shaft 16, none of the input disks 17, 7 are forcibly urged against the power rollers 6, 9.

Although the preferred embodiment as described above has been applied to the toroidal continuous variable transmission of double cavity type, it may be of course be applicable to the toroidal continuous variable transmissions of single cavity type. Instead of the chain gearing and reduction gear train exemplified above for the first and second power-transmitting means for the reverse mechanism, other power-transmitting means such as the belt gearing may be employed with equal utility. Moreover, the combination system of the power-transmitting means at the opposite end of the counter shaft is limited to the system in the preceding description, but any other system may be equally adapted in which the rotation of the output disk is reversed in the rotating direction and transmitted to the output shaft.

As the present invention may be embodied in several forms without departing from the spirit of essential characteristics thereof, the present embodiment is therefore illustrative and not restrictive, since the scope of the invention is defined by the appended claims rather than by the description preceding them, and all changes that fall within meets and bounds of the claims, or equivalent of such meets and bounds are therefore intended to embraced by the claims.

What is claimed is:

1. A toroidal continuous variable transmission comprising thrusting means secured to an input shaft and generating a thrust force along an axial direction of the input shaft, a first input disk arranged confronting to the thrusting means and supported for rotation as well as axial movement relative to the input shaft, a second input disk mounted for axial movement with respect to the input shaft, output disks arranged in opposition to the first and second input disks, one to each input disk, power rollers arranged between the paired input and output disks so as to change continuously the rotational speed of the first and second input disks, depending on tilt angles to the disks, thereby transmitting a power of changed speed to the output disks, reverse means for transmitting rotations of the output disks in a opposite rotational direction, to an output shaft, a forward clutch for shifting the reverse means from a torque-transmitting phase to a freewheeling phase and vice versa, a planetary gear system engaged to the input shaft, and a direct clutch for changing over operating phases of the planetary gear system.

2. A toroidal continuous variable transmission constructed as defined in claim 1, wherein the planetary gear system is composed of a sun gear rotatable in unison with the input shaft, a planet carrier supporting for rotation pinions that mesh with the sun gear, and ring gear meshed with the pinions and secured to the output shaft.

3. A toroidal continuous variable transmission constructed as defined in claim 2, wherein the direct clutch changes over operating phases of the planetary gear system by locking mutually any two members selected out of the sun gear, carrier and ring gear.

4. A toroidal continuous variable transmission constructed as defined in claim 2, wherein the planetary gear system is provided with a reverse clutch to shift the carrier to any one phase of freewheeling and held phases with respect to a casing of the transmission.

5. A toroidal continuous variable transmission constructed as defined in claims 4, wherein the direct clutch makes it possible to bring the output shaft and the input shaft into the torque-transmitting phase when the reverse clutch is in a position that keeps the carrier in the freewheeling phase relative to the casing.

6. A toroidal continuous variable transmission constructed as defined in claims 1, wherein the reverse means is comprised of a counter shaft arranged in parallel with the input shaft, first power-transmitting means connecting drivingly the output disks with an extremity of the counter shaft, and second power-transmitting means connecting drivingly the output shaft with the opposite end of the counter shaft.

\* \* \* \* \*